US00RE37652E

(19) United States
(12) Reissued Patent
Kelly

(10) Patent Number: US RE37,652 E
(45) Date of Reissued Patent: Apr. 9, 2002

(54) PORTABLE DATA STORAGE AND EDITING DEVICE

(75) Inventor: Douglas J. Kelly, Mesa, CA (US)

(73) Assignee: AlphaSmart, Inc., Cupertino, CA (US)

(21) Appl. No.: 09/514,448

(22) Filed: Feb. 23, 2000

Related U.S. Patent Documents

Reissue of:
(64) Patent No.: 5,065,360
Issued: Nov. 12, 1991
Appl. No.: 07/295,364
Filed: Jan. 10, 1989

(51) Int. Cl.[7] ..... G06F 13/00
(52) U.S. Cl. ..... 710/65; 710/52; 708/142
(58) Field of Search ..... 710/33–35, 46–57, 710/62–74; 708/142–160

(56) References Cited

U.S. PATENT DOCUMENTS

| | | | |
|---|---|---|---|
| 3,942,157 A | 3/1976 | Azure | 340/172.5 |
| 4,016,542 A | 4/1977 | Azure | 340/172.5 |
| 4,090,247 A | 5/1978 | Martin | 364/900 |

(List continued on next page.)

OTHER PUBLICATIONS

Cherry Mikroschalter GmbH, "Multi–2000" Keyboard, Mextel Inc. Autokey 20/20 Keyboard Attachment.
Saho Corporation Keyboard Emulator KE–560.
Trace Center International Software/Hardware Registry, Second Edition, 1984, Programs and Modifications Created or Adapted for Use by Handicapped Individuals, Univ. of Wisconsin, Madison, WI.

(List continued on next page.)

*Primary Examiner*—Christopher B. Shin

(74) *Attorney, Agent, or Firm*—Gardner, Carton & Douglas

(57) ABSTRACT

Method and apparatus are described for outputting data from a device, such as a portable keyboard, directly to a keyboard interface 40 of a destination computer 42. The device may be detached from the computer and operate remotely therefrom, in an "active mode" wherein keystroke data is stored in internal memory thereof, for subsequent transfer to the destination computer. Alternatively, the device may be attached to the computer and function in a "bypass mode" (or in a keyboard emulation routine of the active mode) as a standard input keyboard therefor. The destination computer 42 may be a personal computer or a terminal of a mainframe computer. The internal circuitry of the device includes a programmable processor 28, a program memory 30, a working memory 32, an input switch device 34, a display 36 and an output interface 38. A bypass switch device 24 permits the device to operate in the bypass mode. A resident program stored in program memory 30 controls input, editing, translation and output of data. The processor 28 performs all control and data processing functions. The working memory 32 provides scratchpad and data memory required to execute the program steps, and storage for keystroke files input in the transfer mode. The device may record a sequence of keystrokes for subsequent output to the destination computer in the event that faulty operation of the destination computer prevents reception and/or storage of the same, thus providing fault-tolerant data transfer. The output interface 38 communicates data and provides handshaking to the keyboard interface 40 of the destination computer 42.

REEXAMINATION RESULTS

The questions raised in reexamination request No. 09/004, 214 filed Apr. 10, 1996, have been considered and the results thereof are reflected in this reissue patent which constitutes the reexamination certificate required by 35 U.S.C. 307 as provided in 37 CFR 1.570(e).

39 Claims, 7 Drawing Sheets

U.S. PATENT DOCUMENTS

| | | | | | |
|---|---|---|---|---|---|
| 4,179,748 | A | | 12/1979 | Brown | 364/900 |
| 4,293,855 | A | | 10/1981 | Perkins | 340/712 |
| 4,387,296 | A | | 6/1983 | Newell | 235/376 |
| 4,431,988 | A | | 2/1984 | Molusis et al. | 340/712 |
| 4,471,165 | A | | 9/1984 | DeFino | 179/2 A |
| 4,530,069 | A | * | 7/1985 | Desrochers | 710/2 |
| 4,558,315 | A | | 12/1985 | Weiss et al. | |
| 4,634,845 | A | | 1/1987 | Hale | 235/350 |
| 4,689,478 | A | | 8/1987 | Hale | 235/380 |
| 4,710,869 | A | | 12/1987 | Enokizono | 364/200 |
| 4,720,781 | A | | 1/1988 | Crossland | 364/200 |
| 4,749,364 | A | * | 6/1988 | Arney et al. | 361/681 |
| 4,769,764 | A | * | 9/1988 | Levanon | 361/680 |
| 4,839,854 | A | | 6/1989 | Sakami | 364/900 |
| 4,893,263 | A | * | 1/1990 | Myers | 361/684 |
| 4,903,222 | A | * | 2/1990 | Carter et al. | 361/680 |
| 4,964,075 | A | * | 10/1990 | Shaver et al. | 710/67 |

OTHER PUBLICATIONS

Keyboard Emulation Using NRCC's MOD Keyboard, Korba, Nelson and Park, 1984, National Research Council of Canada, Ottawa, Canada, 2nd Int'l Conference on Rehabilitation Engineering, Ottawa, Canada.

The Effect of Increased Sensor Area on Input Rate and Accuracy of the Express III Communication Aid, Lee and Vanderheiden, 1985, Trace R&D Center, RESNA 8th Annual Conference, Memphis, TN, pp. 128–130.

A Direct Access Expanded Keyboard for the Talking Blissapple, Graystone, Kelso, Rodgers and Vanderheiden, School of Rehabilitation Medicine, Vancouver, Canada, Trace R&D, Madison, WI, 1983.

Proceedings, The IEEE Computer Society Workshop on Computing to Aid the Handicapped, Nov. 1982, IEEE Computer Society, Los Angeles, CA, pp. 77–81.

Keyboard Equivalent for Mouse Input, Lee and Vanderheiden, Trace R&D Center, Waisman Center, Madison, WI, pp. 711–713, RESNA 10th Annual Conference, San Jose, CA 1987.

One Finger Operation of the IBM Family of Personal Computers, Lee, Vanderheiden and Rasmussen, Trace R&D Center, Madison, WI.

A Multifunction Alternative Computer "Keyboard" for the Physically Handicapped Using Headpointing Techiques, Gunderson, Kelso and Vanderheiden, 1982, Trace R&D Center, Madison, WI, pp. 77–81.

Accessible Computers from the Box, Vanderheiden, Trace R&D Center, Madison, WI, pp. 1–4, Charts 1 of 4, 3 of 4 (Jul. 1987).

Proceedings of the Seventh Annual Conference of the IEEE Engineering in Medicine and Biology Society, Sept. 1985, IEEE Service Center, Piscataway, NJ.

Development of a Set of International Communication Aids Compatibility Standards Proposals (ICAC STDS) Rodgers & Gunderson, 1984, Trace Center, Univ. of Wis., Madison, WI, 2nd Int'l Conf. on Rehab. Eng.

Curbcuts and Computers: Providing Access to Computers and Information Systems for Disabled Individuals, Vanderheiden, Lee & Scadden, Trace R&D Ctr, Univ. of Wisconsin, Madison, WI.

Features to Increase the Accessbility of Computers by Persons with Disabilities: Report from the Industry Government Task Force, Vanderheiden, Lee & Scadden, Trace R&D Center, Madison, WI, pp. 750–752.

Interfacing Computers for the Physically Handicapped—A Review of International Approaches, Raitzer, Vanderheiden and Holt, National Computer Conference 1976, Univ. of Wisconsin, Madison, WI, p. 209.

Gregg C. Vanderheiden, "Practical Application of Microcomputers to Aid the Handicapped," Computer Magazine, 1981. (p. 7).

Gregg Vanderheiden, "Computers Can Play a Dual Role for Disabled Individuals," BYTE Magazine, 1982. (p. 146, col. 3 & p. 148).

Barry L. Rodgers, David P. Keslo, Gregg C. Vanderheiden, "The Data Routing Module: Accessing Computer Systems with Communication Aids," Proceedings of the RESNA Conference, 1983.

David P. Kelso and Jon Gunderson, "Genetric Keyboard Emulator Architecture For Transparent Access To Standard Software By Handicapped Individuals," Proceedings of the RESNA Conference, 1984.

Jon Gunderson and Gregg Vanderheiden, A Portable Computer–based Writing, Conversation and Computer Access Aid for Severely Motor Impaired Individuals, Proceedings of the RESNA Conference, 1984.

Gregg C. Vanderheiden, "A High–efficiency Flexible Keyboard Input Acceleration Technique: Speedkey," Proceedings of the RESNA Conference, 1984.

Gregg C. Vanderheiden, "Alternate Access to All Standard Computers For Disabled And Non–disabled Users," Proceedings of the RESNA Conf, 1985.

Barry Rodgers, "Design of Universal Keyboard Emulators," Proceedings of RESNA Conference, 1985.

Gregg Vanderheiden and David Kelso, "Use of Transparent Input and Feedback Modification to Allow Access to Standard Educational and Vocational Software," Proceedings of the RESNA Conference, 1985.

Gregg Vanderheiden and David Kelso, "Dual and Nested Computer Approach to Vocational and Educational Computer Systems," Proceedings of the RESNA Conference, 1985.

David Kelso and Gregg Vanderheiden, "Ten–Branch Abreviation Expansion for Greater Efficiency in Augmentative Communication Systems," Proceedings of the RESNA Conference, 1985.

Leslie Dolman and Sherrill Meeks, "Alternative Access Methods for the IBM Family of Personal Computers and True Compatibles," Proceedings of the RESNA Conference, 1987.

Popular Computing, "The Portable Computer Keyboard," 1983, p. 142.

ZYGO Industries, Inc., "TETRAscanII/scanWRITER Computer Keyboard Emulators," 1983, product literature.

Gregg Vanderheiden, ed., "Trace Center International Software/Hardware Registry," 1983, excerpted pages.

Gregg Vanderheiden, ed., "Trace Center International Software/Hardware Registry, Second Edition," 1984, excerpted pages.

Prentke Romich Company, "1984 Suggested Price List," 1984.

Jon Gunderson, Barry Rodgers, Susan Fishman, Ken Crocker, Gregg Vanderheiden, "A Journeyer's Guide to the Trine System," 1985, excerpted pages.

* cited by examiner

FIG. 4

SAMPLE DOCUMENT AS STORED IN MEMORY BY WP1

| | | | | |
|---|---|---|---|---|
| 58 | [CEN] | 00000001,00000001 | 64 | CENTER FUNCTION |
| 56 | A | 00000010,00000010 | 64 | CHARACTER "A" |
| 60 | [TAB] | 00000011,00000011 | 64 | TAB FUNCTION |
| 69 | [CR] | 00000100,00000100 | 64 | CARRIAGE RETURN FUNCTION |

66 [CEN]ANNUAL REPORT[CEN][CR][CR][CEN]1990[CEN][CR]
[CR][CR][TAB]10COMTECH INC.[TAB]55LONG BEACH[CR]

SAMPLE DOCUMENT AS STORED IN MEMORY BY WP2

| | | | | |
|---|---|---|---|---|
| 58 | [CEN] | 10000001,00000001 | 64 | CENTER FUNCTION |
| 56 | A | 10000010,10000010 | 64 | CHARACTER "A" |
| 60 | [TAB] | 10000011,10000011 | 64 | TAB FUNCTION |
| 69 | [CR] | 10000100,10000100 | 64 | CARRIAGE RETURN FUNCTION |

68 [CEN]13ANNUAL REPORT[CR][CR][CEN]351990[CR][CR]
[CR][TAB]01COMTECH INC.[TAB]02LONG BEACH[CR]

PORTABLE DATA STORAGE AND EDITING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to methods and apparatus of data storage and transfer, and more particularly to devices and processes for input of data from remote locations and for later transfer of the data to a destination computer.

There is a long felt need in the business, industrial and scientific communities for a method and apparatus providing an ability to record thoughts and data in remote locations. Recent electronic advances have made possible a wide variety of devices which attempt to meet this need. Portable computers, laptop computers and portable dedicated data logging devices are now commonly found in all areas of our society. Input methods range from keyboard and bar code scanner entry to voice and optical character recognition systems.

An important aspect of these devices is their ability to transfer the information stored therein to other devices. These other devices, such as desktop computers and mainframe computers, for example, often have a greater ability of analyzing, displaying, or disseminating data, when compared to the remote devices. Publishing houses, for example, have extremely powerful text editing and formatting computers with capabilities far beyond those of any portable computer. Data transfer has, accordingly, become extremely important and has given rise to an entire industry of consultants, designers and manufacturers.

2. Prior Art

Many techniques have been devised to effect the transfer of stored data between devices. Serial and parallel transfer protocols, diskettes and other removable media, advanced communications software and complex communications devices make data transfer possible. In few circumstances, however, is data transfer both truly convenient and economical.

Laptop computers are a recent and effective approach to solving the problem of remote entry of textual and numerical data. These computers are light in weight and similar in function to standard office computers, and generally possess floppy disk drives and a wide variety of communications ports as standard features.

Data transfer between such a laptop computer and a personal computer is sometimes attempted by copying data onto a floppy diskette of the laptop computer and moving the diskette to the desktop computer. Often, however, the diskette drives of laptop and desktop computers are not compatible due to differences in the data format or type of disks. Thus, data transfer via floppy diskette does not provide a truly effective method of data transfer from a remote data entry device to a computer having a data storage bank.

Similarly, direct transfer of data via cables requires that communications ports of the correct type are present on both the laptop and desktop computers. Cable transfer also requires installation of communications software on both computers, and a cable to connect the ports of both computers with the correct pin-to-pin configuration. Use of additional cable devices such as gender changes and pinout changers is also often required to match these ports. Existing communications software often changes the format of a data file and delivers it to a remote subdirectory. To use the transferred file, it must first be copied to the data directory for the application and erased from the remote subdirectory. The data must then be imported into the applications program. In the case of spreadsheets and database management programs, the data must also be parsed.

Cable transfer requires access to the expansion slots of the destination computer. These expansion slots are generally located on the back of the destination computer. Such an arrangement often requires considerable manual dexterity, such as reaching or lifting, to gain access to the port. This is a danger to expensive equipment and inconvenient for valuable personnel. Thus, direct or cable data transfer is inefficient, time consumptive, and frequently difficult to achieve.

In summary, existing techniques for data transfer between laptop computers and desktop computers require the user to provide compatible diskette drives, communications software, file translation software, cabling or other devices. These techniques also require that the user have a considerable understanding of the directory and file structures of the laptop and the desktop computer as well as an ability to access the back and perhaps even the interior of the desktop computer.

Data transfer between laptop computers and mini or mainframe computers is yet more difficult than the transfer described above. Operating systems, file structures, diskette drives and communications protocols are less compatible for such computers than for transfers between laptop computers and desktop computers. The transfer thus often requires additional hardware and software, which is generally expensive due to the wide variety of mini and mainframe computers and the correspondingly lower demand for a given transfer configuration.

Presently available remote data acquisition and storage devices, themselves, have still other problems in transferring data. These devices generally do not have diskette drives or other removable storage media. They usually rely on the cable transfer techniques summarized above. Such devices also require installation of custom circuit boards which, if available, fit into the expansion slots of the destination computer. Purchase and installation of these boards is expensive and may tax the power supply capacity of the destination computer.

An additional problem of laptop computers, unrelated to data transfer, arises from the unique size and layout of the keyboard of a laptop computer, with respect to a keyboard of a destination computer. Due to the greater portability of the laptop, laptop users adapt to the unconventional layout and become proficient in its use. After data is transferred to the destination computer, however, these users are required to adapt to an unfamiliar keyboard. The user must thus concentrate more on the keyboard, leaving less attention available for devoting to the actual task. Greater typing effort, poorer quality work and increased keystroke error are common results of this deficiency.

In U.S. Pat. No. 4,710,869, Enokizono describes a keyboard connected to a master CPU (central processing unit) which is in turn connected to a keyboard emulation circuit and a slave CPU. The object of this arrangement is to control multiple devices by providing data from a single keyboard to a plurality of microprocessors. This design, however, does not suggest that the keyboard, master CPU and keyboard emulation circuit be arranged as a remote device with a working memory, removed from a slave CPU and capable of inputting, editing or translating data independently of the slave CPU. Additionally, the disclosed device transfers keystrokes to the slave CPU on the basis of whether the keystroke is on a table in the master CPU, not on the basis of the mode of the master CPU. Further, no capability is described for replacing keystroke characters by other single characters or by strings of characters, known as macros, or for providing translation in order to permit data transfer to various different application programs while using the specific control codes of the target application program. Finally, the system fails to allow a bypass connection of the output of the keyboard to the keyboard interface of the slave processor.

Similarly, a multi option keyboard is available from Cherry Mikroschalter GMBH under the designation "MULTI 2000". This product is described in an operating manual therefor as having an 8-bit microcontroller and as storing data which is changeable by the user. Specifically, a number of function keys may be coded with byte strings selectable by the user. The keyboard includes a display for inputted characters. The keyboard may communicate with its host PC (personal computer) using an RS 485/422 interface or via an RS 232 serial asynchronous interface at various baud rates, using ASCII characters which may be transformed into known IBM codes. However, the keyboard, which may also include an integrated bar code reader, a magnetic card reader or a mouse, is incapable of entering and editing data, such as barcode data, independently of its host PC. Moreover, the keyboard includes neither a portable power supply nor software allowing the user to record, edit or translate character strings into formats compatible with various application programs operating on different computers. Thus, the keyboard (which derives its power from the host PC) cannot be used as a portable device for data entry remote from the host.

Other keyboard units are known in the art, as illustrated by U.S. Pat. Nos. 4,431,988; 4,387,296; 4,293,855; 4,179,748; 4,090,247; 4,016,542 and 3,942,157. Of these, the U.S. Pat. Nos. 4,016,542 and 3,942,157 disclosures provide a portable data gathering system including a keyboard, a display and a memory, together with an arrangement for conveying the data therefrom to a remote terminal or host processor. However, the device is apparently intended to be merely a temporary data storage tool for communication with a host. There is no suggestion of using the same as a standard keyboard input for its host, or of communicating with the host via the keyboard interface thereof.

In the U.S. Pat. No. 4,090,247 there is disclosed a similar portable data entry device, including a memory for storing a plurality of multiple character records and a display. The device, which is self powered, includes a connector for direct connection between the device and a data system.

Still another portable data entry device is described in the U.S. Pat. No. 4,387,296, for use in meter reading. Thus, an input/output magnetic tape is provided for mass data storage and an EAROM (electronic alterable read only memory) is included, for storing utility rate tables. Thus, the device may be used automatically to calculate a customer's utility charges and to print customer bills for direct delivery to the customer.

The U.S. Pat. No. 4,179,748 disclosure teaches a programmer unit, for connection to a machine keyboard, which is capable of storing (as a program) a sequence of key closures and of supplying to the machine and through the keyboard simulated key closures in the order in which the key closures were generated and stored. However, the device is simply intended to convert a non-programmable calculator into a programmable calculator, rather than to provide a portable data storage and editing device.

The U.S. Pat. No. 4,293,855 disclosure identifies a portable communication device for providing communication by people having restricted physical and/or motor handicaps. Thus, a keyboard and display are provided.

The U.S. Pat. No. 4,431,988 describes a further keyboard, including a random access memory. The keyboard is configurable for entry to several interfaces and several process controllers.

None of the above described art, however, provides a device which may be used for both remote data entry and as a keyboard input device for a host computer. None of the art teaches that such a device should be connected to its host through the keyboard interface of the host, thus to permit the portable data entry device to function as the standard keyboard for its host. Moreover, none of the art teaches that such a portable device may include editing capability and may provide output data simulating any of a plurality of application programs.

There is thus a need in the prior art for a device which may accept and edit input data, for use by a plurality of application programs, and which functions both as a remote entry device and as a standard keyboard for its host processor.

SUMMARY OF THE INVENTION

Accordingly, it is a primary object of the present invention to provide improved method and apparatus for data input, editing and/or transfer, overcoming the drawbacks of the prior art.

It is a more particular object of the invention to provide a device which is capable of operating both as a remote, portable, data entry device for a processor and as a standard keyboard therefor.

It is another object of the invention to provide a convenient and economical method of data transfer from a remote data entry device to a separate computer.

It is a more specific object of the invention to provide a method of data transfer which eliminates the need for the handling of diskettes or other removable storage media.

It is a further object of the invention to provide a method of data transfer which requires no special communications port on the destination computer.

Still another object of the invention is to provide a method of data transfer which utilizes a standard port on the destination computer which is most easily recognized and understood by computer users and which generally requires a simple, identifiable and inexpensive cable.

Yet another object of the invention is to provide a method of data transfer which delivers data directly, and in proper format, into application software in a destination computer to eliminate the need for import or parsing, and to provide the data to the proper file subdirectory for the application program.

It is a further object of the invention to provide a method of data transfer to mini or mainframe computers in a convenient and inexpensive manner.

It is an additional object of the invention to provide a method of data transfer from remote data input and storage devices in a convenient and inexpensive manner which loads the power supply of the destination computer only to a level anticipated in its design.

It is an additional object of this invention to provide a remote device capable of outputting stored character strings known as macros to another computer as well as to its own onboard files.

Still another object of the invention is to provide a method of using a remote data input or storage device, such as a laptop computer, as a user interface (keyboard) for another computer.

It is yet a further object of this invention to provide a user interface for a destination computer with the ability to record outputted keystrokes and restore damaged files on the destination computer (fault-tolerant operation).

In accordance with the foregoing objects, there is provided a portable data input, storage and editing device. The inventive device includes an input device for data entry; a storage for storing data entered by the input device; and a transfer element for transferring data entered by the input device to a host computer. Additionally, a processor is provided for controlling the input device, the storage and the transfer element to operate in one of a plurality of modes. Included in the operating modes are an active mode, in which the entered data is stored in the storage and the transfer element accesses data from the storage for transfer to the host computer, and a bypass mode, in which the transfer element transfers data directly from the input device to the host computer.

Preferably, the host computer includes a keyboard interface and the transfer element includes a connector for connecting the inventive device to the keyboard interface of the host computer. Thus, the inventive system operates for transferring the data entered by the input device to the host computer via the keyboard interface.

In that regard, the input device may be a keyboard for inputting data to the host computer, thereby providing for the host computer a detachable keyboard for standard and remote operation. More specifically, in standard operation the processor controls the input device, storage and transfer element to operate in the bypass mode, and the keyboard is attached to the host computer via the keyboard interface to input sequences of characters to the host computer. On the other hand, in the remote operation the processor controls the input device, storage and transfer element to operate in the active mode, and the keyboard is detached from the host computer for inputting sequences of characters of the entered data to the storage, for subsequent transfer via the keyboard interface to the host computer.

In accordance with one feature of the invention, there is included an onboard power supply for providing power to the input device, the storage and the processor. Additionally, the transfer element includes a power transfer component for selectively transferring power from the host computer to the input device, storage and processor when the device is connected to the host computer.

A significant aspect of the invention provides an editor for editing strings of characters represented by the data entered by the input device prior to transferring the data to the host computer. Similarly, a translator may be provided for translating sequences of entered characters from one format, usable by one application program running on the host computer, to another format, usable by another application program running on the host computer. Further, a macro generator may be included. Such a macro generator replaces one sequence of input keystroke characters by a different sequence of keystroke characters. Typically, a short sequence, for example a one- or two-keystroke sequence, is replaced by a longer sequence, such as a specific text portion or a particular sequence of control characters.

In accordance with another aspect of the invention, there is provided a bypass controller for causing the processor to establish the bypass mode. The bypass controller may include a program for selecting among a plurality of operating modes, including a keyboard emulation mode wherein the input device emulates one of a plurality of keyboards, thus allowing input and data transfer to a plurality of different host computer types. Alternatively, the bypass controller may include a plurality of switch contacts for routing data from the input device to the transfer element via the storage, and for routing data from the input device to the transfer element bypassing the storage.

Where an editor is included, the bypass controller is arranged for routing data from the input device to the transfer element via the storage in the active mode and for routing data from the input device to the transfer element in the bypass mode, in order to bypass the storage and the editor in the bypass mode.

An output key may be provided, for initiating a data output transfer via the transfer element to the host computer.

These and other objects, features and advantages of the present invention will become apparent to those skilled in the art from the following description and drawings, wherein there is shown and described a preferred embodiment of the invention, simply by way of illustration and not of limitation of one of the best modes (and alternative embodiments) suited to carry out the invention. As will be realized upon examination of the specification and from practice of the same, the present invention is capable of still other, different, embodiments and its several details are capable of modifications in various obvious aspects, all without departing from the invention. Accordingly, the drawings and the descriptions provided herein are to be regarded as illustrative in nature and not as restrictive of the invention.

BRIEF DESCRIPTION OF THE DRAWING

In accordance with the above described objects and features of the invention, a preferred embodiment thereof is shown in the accompanying drawings, wherein:

FIG. 4 shows the sample document as used in two word processors;

DETAILED DESCRIPTION OF A PREFERRED EMBODIMENT OF THE INVENTION

Figure 1:
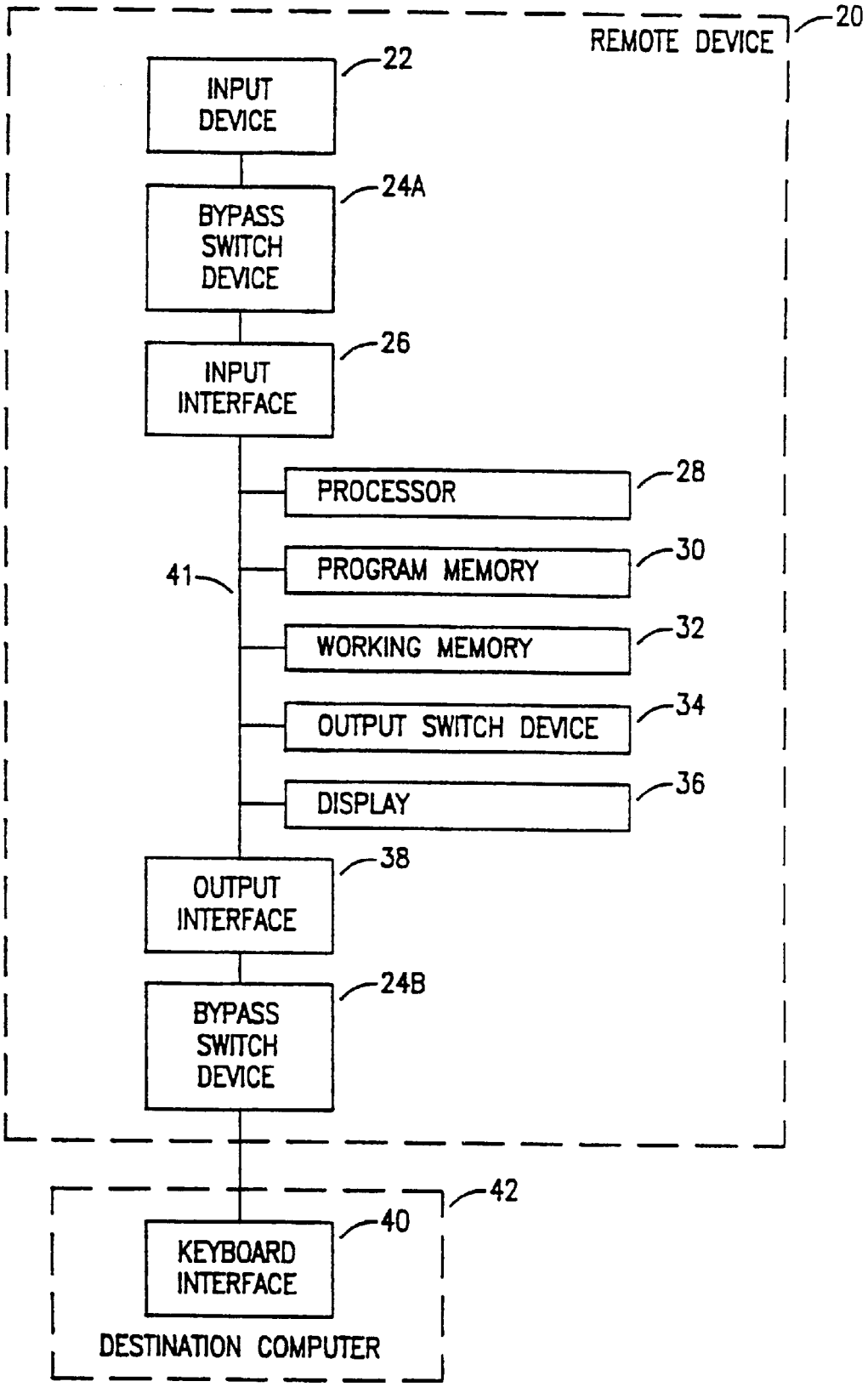
FIG. 1 is a schematic circuit diagram of a device according to the invention, capable of input, translation, editing or storage of data and of outputting such data to the keyboard interface of another computer.

FIG. 1 is a schematic circuit diagram of a remote device 20 embodying a portable data storage and editing device according to the invention. Remote device 20 includes an input device 22, an input interface 26, a processor 28, a program memory 30, a working memory 32, an output switch device 34, a display 36, and an output interface 38. The output interface 38 is plug-connected to a keyboard interface 40 of a destination computer 42 via a cable.

Advantageously, the port for keyboard interface 40 is easily recognized by a user and connection thereto may be had by use of an inexpensive cable. This port is often located at the front of the computer where it is very accessible. This port usually has its own interrupt to the processor of the destination computer. Utilization of this port for communication between devices and destination computer 42 eliminates the need for installation of any specialized communication software or hardware on the destination computer. In accordance with the invention, there is provided a bypass arrangement illustrated by switch devices 24A and 24B, which directly connects the input device 22 with the keyboard interface 40 of the destination computer 42 when power is removed from the remote device 20. Power for the input device 22 in this event is provided by the keyboard interface 40 of the destination computer 42. Preferably, the bypass arrangement is provided as a relay structure. However, the bypass arrangement further includes a software toggle configuration which provides several active modes of operation, including a first mode, wherein data is inputted to and edited by the components of device 20; u second mode wherein data is transferred from memory 32 to the destination computer 42, and a third mode providing emulation of any of a plurality of keyboards.

A menu is displayed on display 36 to inform the operator of the specific keys to be operated to switch between the various modes, as well as to initiate or terminate macro operation and to record incoming data from input device 22. Numerous menu programs are known in the art and are thus omitted from the present description. A "bypass" mode may be one of the choices provided by the menu, to override various features of device 20 and to provide direct data transfer from input device 22 to destination computer 42, thus effectively replacing (or supplementing) a keyboard of computer 42 with input device 22.

In any of the operating modes, the input device 22 is connected to the input interface 26. Items 26–38 are connected to the data bus of the remote device 20. The output interface 38 is connected to the keyboard interface 40.

OPERATION OF THE INVENTION

In a preferred embodiment, the remote device 20 is used as a keystroke recording device, capable of inputting and storing keystroke codes from a standard keyboard. Upon closing of an output switch 65 of output switch device 34 (shown in FIG. 5), keystrokes are outputted sequentially from the inventive device 20 to the keyboard interface 40 of a destination computer 42. The remote device 20 has a battery (not shown) to provide an onboard power supply.

Figure 2:
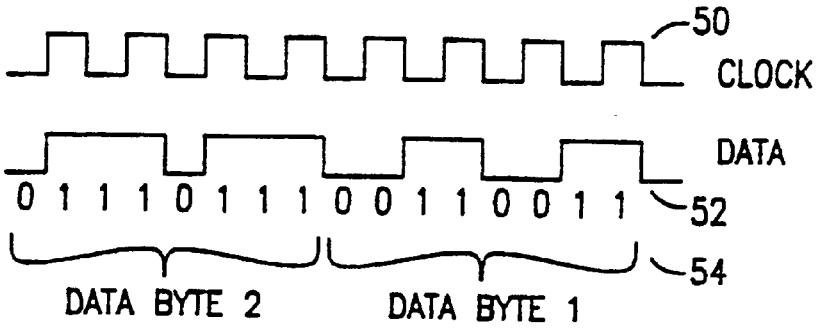
FIG. 2 is a diagram of sample data bytes.

In the presently preferred embodiment, the input device 22 may be a standard keyboard, such as a Keytronic KB5151, distributed by KeyTronic Corporation of Spokane, Wash. As known in the art, this keyboard (or other input device) is connected to the input interface 26 by data and clock lines. Input device 22 derives its power from the remote device 20 via a standard +5V DC and ground connection (not shown). Each keystroke is encoded by well known encoding circuitry in the keyboard into a two-byte code. The keyboard is configured to transmit to the input interface 26 the code, serially transmitted on one line, and reference clock signal pulses, transmitted on another line. FIG. 2 shows examples of clock pulses 50, data pulses 52 and data bytes 54 formed by the data pulses 52.

The input interface 26 receives the data, converts the data into parallel format and sends an interrupt to the processor 28. Input interface 26 may be a standard IBM personal computer keyboard interface circuit, made by the International Business Machines Corporation of Armonk, N.Y. This interface is compatible with the input device 22, described above, and the processor 28, described below.

Processor 28 reads the data from the interface 26 and writes the data to a first memory location in the working memory 32. The processor 28, in this instance, may be an Intel 8086 microprocessor, available from Intel Corporation of Santa Clara, Calif. Processors of this type are well known and are used in the IBM XT computer. Processor 28 is controlled by a resident program stored in program memory 30. Program memory 30 is preferably a ROM (read-only memory) while working memory 32 is a RAM (random-access memory), preferably of a type which is backed up by batteries. Subsequent data bytes are sequentially stored by processor 28 in other locations of memory 32.

Figure 5:
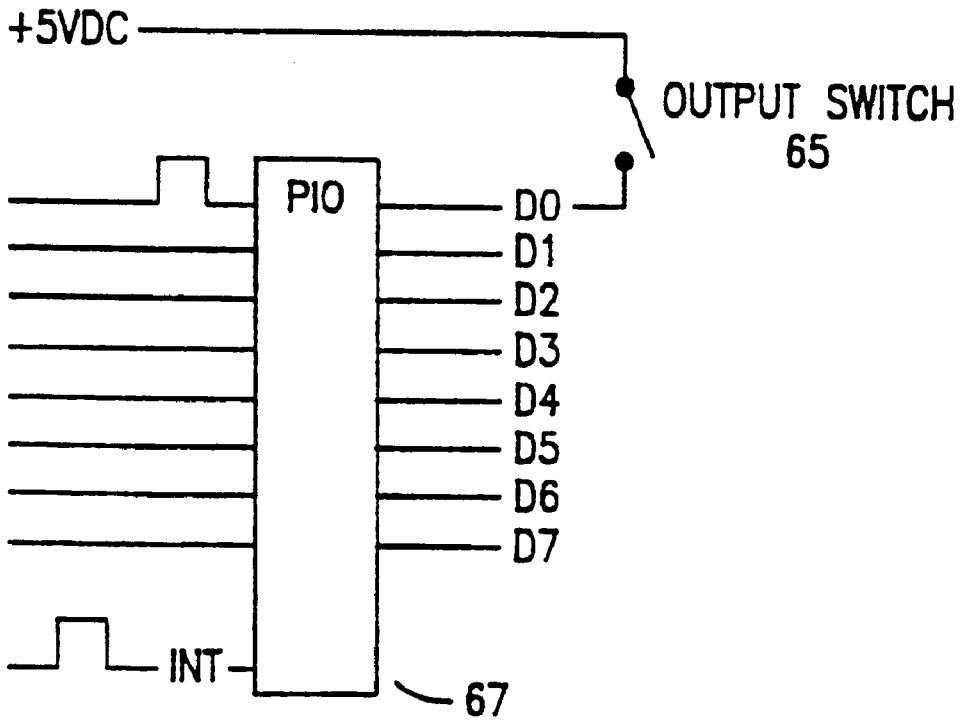
FIG. 5 is a schematic circuit diagram of a PIO used as an exemplary input switch device.

Output switch device 34 acts to cause processor 28 to transfer input information identifying closure of input keys (e.g., in a keyboard forming input device 22) to the data bus 41. The device provides an input to processor 28 for initiating a keystroke output transfer. Output switch device 34 may include a PIO (parallel input/output device) such as a Motorola 6820 PIA, available from Motorola Corporation of Phoenix, Ariz. FIG. 5 shows one configuration of an output switch device, including an output switch 65 connected to a PIO 67, configured to receive closure data from the output switch 65 on one of its input lines, shown illustratively as line D0. The PIO 67 of switch device 34 is additionally configured to generate an output switch interrupt to the processor 28 on an output interrupt line 69, in response to the closure data on line D0, and to write a byte to the data bus 41 when enabled by the processor 28.

Figure 6:
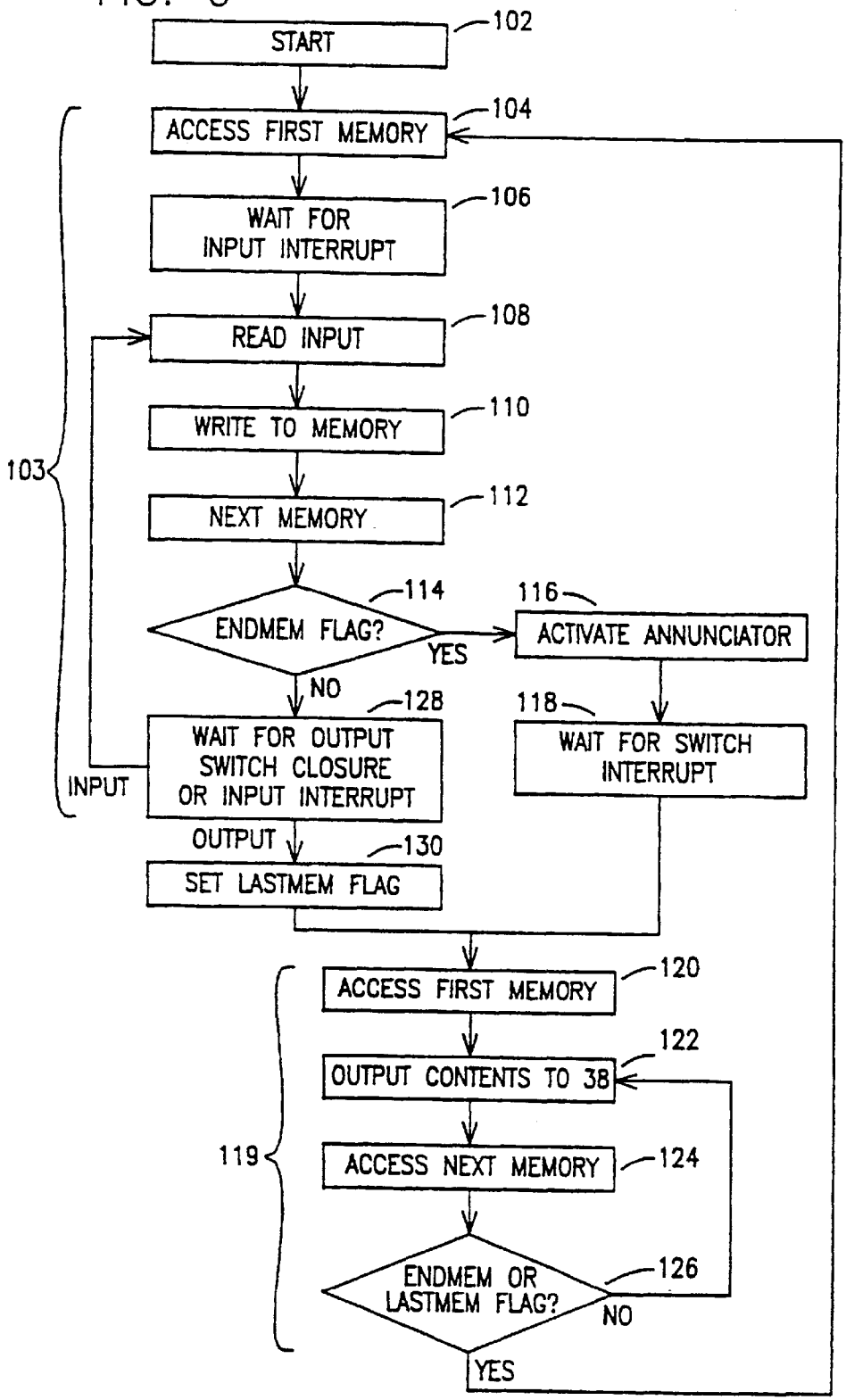
FIG. 6 is a flowchart of a program for control of data input and output in the inventive device.

The data byte written by the PIO (which is read as "10000000" when enabled by processor 28) indicates closure of output switch 65 to the resident program in memory 30. It should be noted that PIO 67 is dedicated to the single output switch 65 and that no other signals are input or output on any other data line thereof. Upon receipt of the data byte and in response thereto, the resident program branches to an output routine which controls processor 28, in a well known manner, to function in accordance with the output routine. In another configuration, output switch 65 is provided as a software enabled, software detected, key on a keyboard of input device 22. In a further configuration output switch 65 is a menu selected output option. In accordance with the invention, the processor is controlled to operate as illustrated by the flow chart of FIG. 6.

As shown therein, a simplified data entry program begins its operation by awaiting characters for storage or a signal to output stored characters. Upon starting the program at step 102, an input routing 103 including steps 104, 106, 108, 110, 112, 114, 116 and 128 is executed by the processor. Therein, the first memory location is accessed by the processor 28 at step 104. Upon receiving an input interrupt from the input interface 26 at step 106, processor 28 reads the data from input interface 26 at step 108 and writes the data to memory at step 110. At step 112 the next memory location is accessed. If the location accessed at step 112 is determined at step 114 to be the last memory location, by detection of an ENDMEM flag (set upon accessing the last location), the program controls the processor at step 116 to activate an annunciator to warn the operator. Specifically, a LED (light-emitting diode) may be activated, a message may be displayed on a CRT, LCD, or other display, an oscillator may be operated to cause a speaker to generate a tone, a voice warning may be issued, the input may be halted so that no further inputs are accepted, or other known functions may be performed to alert the operator to the end-of-available-memory condition and to the need to initiate the output routine by operating an output switch.

At this time, the input routine is terminated and further input is disabled, until the device 20 is connected to 65 is activated to output the contents of memory 32 to computer 42.

Thus, at step 118 the processor halts further operation and awaits receipt of the switch interrupt from the output switch device 34. Upon receipt of the switch interrupt, the processor executes an output routine 119, including steps 120–126. Therein, the processor accesses the contents of the first memory location at step 120, outputs the same to output interface 38 at step 122, and accesses the next memory location at step 124. During execution of the output routine a separate display (not shown) may be activated to alert the operator that a "data output" is being implemented. At step 126 the processor tests for the ENDMEM flag (or LASTMEM flag, described below) for the "next" location accessed at step 124. If the flag is not set, the processor outputs the contents of this location at step 122 and repeats the sequence of steps 122, 124 and 126 to output the entire contents of the memory to interface 38, for output therefrom to the destination computer 42.

Once it is determined at step 126 that an ENDMEM flag was detected and the last available memory location has been accessed, the device 20 is enabled to receive further input data. Specifically, the processor returns to step 104 of the input routine, accessing the first memory location at step 104 and awaiting an interrupt from the input interface 26 to identify operation of an input key on input device 22.

During execution of the input routine, when the ENDMEM flag is tested for the next memory location at step 114, under typical operating conditions additional memory remains and the test result is negative. In that event, at step 128 the processor awaits either an output switch closure or an input interrupt. If an input interrupt is detected, the program loops back to step 108 in the same manner as if an input interrupt were detected in step 106, there to read the next data byte and to write the byte into memory. However, if it is determined at step 128 that the output switch has been operated, the processor 28 exits from the input routine and enters the output routine to begin outputting the data as follows.

Since step 128 is performed after a negative result of the test of step 114, there is memory remaining. Accordingly, the processor sets a last memory flag (LASTMEM) at step 130, to indicate that the cell contains the last input data which has been stored. It will be recognized that such a flag is similar to an "ENDFILE" FLAG used in other environments so that, advantageously, various techniques of file manipulation and block transfer designation may be used herein. Control then proceeds to the output routine of steps 120–126, which accesses the first memory location and sequentially outputs the data as two-byte codes to the output interface 38 until the LASTMEM flag is reached, as previously described. Since the output routine in this instance was accessed through step 130, output termination will occur upon reaching the LASTMEM flag when the last available data byte has been outputted.

The output routine maintains the timing and sequence of the output codes within preset values corresponding to the capabilities of the keyboard interface 40 of the destination computer 42.

Upon termination of the output routine at step 126, the program branches back to the input routine, as previously described. In the simplified arrangement disclosed herein, the next incoming data would overwrite previously existing data, the output of which was described above. It will be appreciated by those of ordinary skill in the art that an additional annunciator may be provided, to alert the operator to such a possible overwrite condition, and to assure that all data has been transferred to the destination computer prior to input of further data. Such an approach permits overwriting of the previous data only upon the operator's awareness and control. Still additional control may be provided to permit the user to specify and transfer only specific blocks or files of data in response to output switch closure. Further control allows the user to erase or overwrite data without transfer by the output routine.

The output interface 38 may also be a PIO, as specified above for switch device 34, wherein the PIO is enabled by the processor 28 to read the data byte. This device is additionally configured to transmit data serially on one line, and to transmit reference clock signal pulses on another line, to the keyboard interface 40 of the destination computer 42.

The keyboard interface 40 may be a standard personal computer keyboard interface circuit, as is available for the IBM XT computer. As will thus be appreciated by those skilled in the art, keyboard interface 40 reads the data byte as though it were arriving from a standard keyboard and, responsively thereto, generates an appropriate interrupt to the destination computer 42 which, typically, may be an IBM XT computer.

Figure 7A:
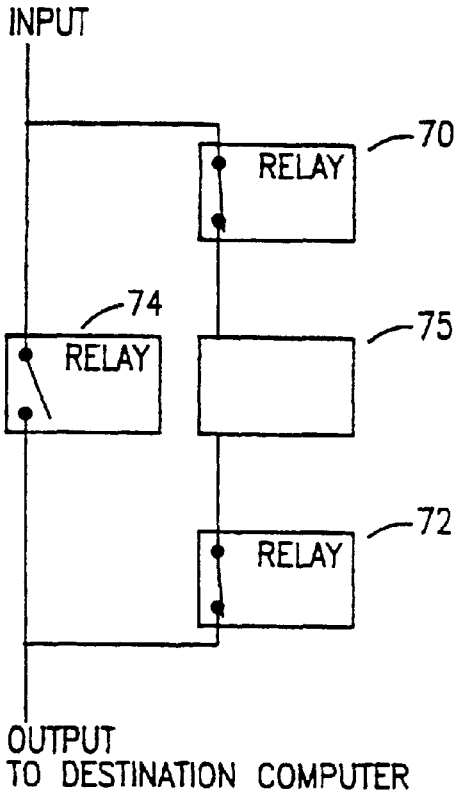
FIGS. 7A and 7B are schematic circuit diagrams of bypass switching arrangement for the inventive device.
Figure 7B:
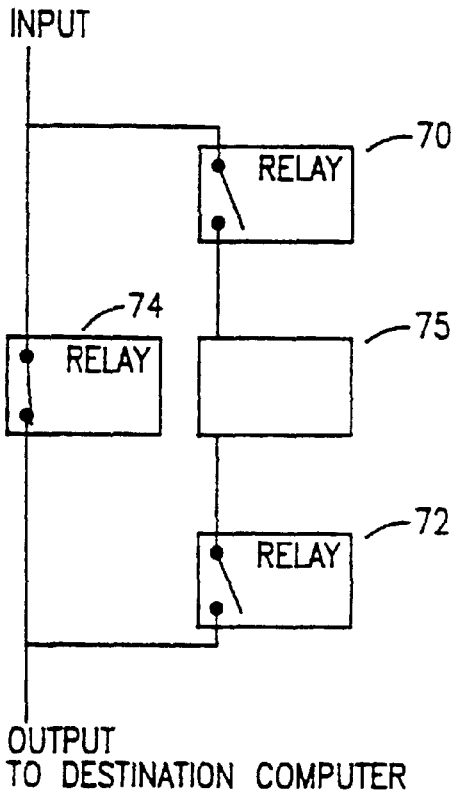

The bypass switch devices 24A and 24B shown in the FIG. 1 embodiment of remote device 20 are preferably formed using a single multi-contact relay, the contacts of which are arranged as illustrated at 70, 72 and 74 in FIGS. 7A and 7B. FIG. 7A shows an arrangement wherein the contacts 70 and 72 are pulled closed and the bypass contacts 74 are opened. Block 75 represents elements 26–38 of DEVICE 20 in FIG. 1. The control windings for the relay contacts are not shown. However, an arrangement of a control circuit including the relay windings will be readily implemented by those of ordinary skill in the art. For example, a single control winding may be connected in series with the power switch (not shown) of the remote device 20. A pair of normally-open contacts may be connected in the manner shown for contacts 70 and 72, and a normally closed-contact may be connected as shown for contacts 74. It will be appreciated that either contacts 70 or 72 may be omitted without affecting the flow of information described herein. However, both contacts are shown in order to provide complete isolation of elements 28–38 from any transient voltage conditions when the elements are bypassed as shown in FIG. 7B.

The arrangement of FIG. 7A, wherein contacts 70 and 72 are closed and contacts 74 are opened upon application of power to the device of the invention, routes keystroke data through block 75 for operation as hereinabove described. This mode of operation is hereinafter referenced as the "active mode" of operation. When the device power is "off", however, contacts 70 and 72 fall open and the bypass contact 74 closes, as shown in FIG. 7B. This arrangement provides a "bypass mode", which permits keystrokes to bypass entirely the processing portion of device 20 and to flow directly to the destination computer 42. In this mode of operation, the internal capability of the device is bypassed.

Advantageously, the power connections may also be routed through such a relay structure, through different contact pairs (not shown) which may be connected precisely in the manner of contacts 70, 72 and 74. Thus, in the bypass mode (power off) the keyboard is powered directly by the destination computer 42.

Alternatively, the invention may include power sensing, switching and regulating circuitry on the power leads of its keyboard interface. Such power sensing, switching and regulating circuitry is well known in the electronics industry. This circuitry would include a voltage-measuring chip to sense when voltage was being applied to the power leads of the device and a mechanical or solid-state relay to switch the device into a mode where the applied voltage could be utilized by the device. As many personal computers limit the amount of power which can be supplied to a keyboard (about 1 watt), power regulation circuitry and charging adapter/modified keyboard cable assembly may be provided as described below. In addition to the standard clock, data, +5V and GND lines, this modified keyboard cable has a provision for tapping into the +5V line with a higher voltage or amperage charging adapter. The ground of this adapter would be common with the host computer ground and, in the case of a higher voltage adapter, a diode would be installed on the +5V line between the tap and the host computer. The purpose of the diode is to isolate the host computer from the higher voltage of the charging adapter.

The above described complete configuration advantageously provides the device with additional power. The power sensing, switching and regulation circuitry hereinabove described can additionally be configured to sense the higher supply voltage and, in response thereto, enable device functions which consume greater power, such as screen backlighting or battery charging.

Thus, the present device includes three modes of power operation. In the first mode, the device operates on internal power. The second mode permits the device to be attached to a host computer by the keyboard interface and to derive power from the host. The third mode utilizes a charging adapter attached to the keyboard cable which allows increased power transfer. Thus, the design of the device considers the ability of the host computer to provide power and limits consumption to levels anticipated in the design of the host computer.

The present invention thus includes a significant advantage. The remote device may be operated as a conventional keyboard of the destination computer 42 in the bypass mode, or in a keyboard emulation routine of the active mode which simulates the bypass mode destination computer 42. In the bypass mode, keystrokes from the input device (keyboard) 22 are routed directly to the destination computer via keyboard interface 40, using techniques known in the art. However, the keyboard may also be detached from its destination computer and may thus be operated at a remote location, whether powered by a separate source of power or by on board battery power, storing in memory 32 the keystrokes input by the operator. Upon return to its 'home-base' or host computer, device 20 is again connected to the keyboard interface 40 of destination computer 42 for operation as a conventional keyboard and for transfer of the remotely stored keystrokes from memory 32 to computer 42.

In an alternate embodiment of the invention, the input device 22 may not be compatible with the keyboard interface 40 of the destination computer 42. Such a situation arises when using input devices such as keyboards which are incompatible with the destination computer 42, modems, optical character recognition systems, barcode scanning systems, optical or magnetic data storage systems, computers, and industrial or scientific instruments/transmitters and the like. A different input interface, compatible with digital data from such devices, is accordingly provided in the alternate embodiment, replacing the interface 26 of FIG. 1. The program memory 30 of the alternate embodiment contains additional program steps to read from, and provide handshaking signals to, a given input device using a given communication protocol. Data transfer formats may thus include keystroke data format, hexadecimal, binary coded decimal, ANSI, ASCII, or custom formats.

The additional program resident in memory 30, including a translation table, is required in the alternate embodiment for translating the input data from the input device into the applicable keystroke data format for keyboard interface 40 of the destination computer 42. As will be appreciated by those of ordinary skill in the art, the data translation may be performed on a character-by-character basis, during input or output. Data translation may also be performed on a batch basis between input and output.

In yet another embodiment of the invention, the input device is a keyboard and output switch device 34 is a key on the keyboard which initiates output under program control. Moreover, a display 36 is provided, such as an 80 character by 25 line backlit LCD by Optrex of Japan. Although not shown in FIG. 1, it will be appreciated by those skilled in the art that a display driver chip is included for driving display 36. Further, a resident text editing program is included in program memory 30. Such programs are known in the art and are not further described herein. Of course, instead of being resident in program memory such a program may be externally loadable into working memory 32. The inclusion of a text editing program allows data from memory to be called up to the screen, edited, and returned to memory for subsequent output to the keyboard interface 40.

Since such programs are known in the art, a flow chart of the same is not provided herein. However, the inclusion of such a program in a portable keyboard (or other input device) for editing information to be input to a destination computer as keystrokes, via the keyboard interface, provides an advantage of the present invention which has not been disclosed in the prior art. In that regard, the input device may be a 'laptop' computer, which further extends the utility of the invention.

Other capabilities of the inventive arrangement include storage of character strings, known as macros, and transfer of the strings to the destination computer by actuation of single keys, such as the function keys, or combinations of multiple keys, such as "Alt-A". Although the specific macro generating program is not described, such programs are well known.

An additional capability of a device which acts as both an on-line and an off-line data entry device is realized when these two characteristics are combined. The device while in "keyboard" mode (acting as an input device) can concurrently be set in a "record" mode. In this combined mode, the keystrokes which flow to the host computer are simultaneously stored as keystrokes in the remote device. In the event of a computer failure the damaged file may be restored by "playback" of the recorded keystrokes to the host computer.

For example, a user may recall an existing word processor file from the host computer to the screen for editing. Before the user begins editing (usually the cursor will be flashing in the upper left hand corner of the computer screen), the user toggles the "recorder" to the on position. The user then makes changes to the file. When the changes are complete, the user toggles the "recorder" off. Instead of saving the file, the user escapes from the file without saving changes.

Alternatively, a power failure may cause RAM memory on the host computer to be erased before the user has an opportunity to save his or her work. Fault tolerant operation is achieved by recalling the unedited word processor file on the host computer to the screen again. The user then toggles the device to "playback" the recorded keystrokes. This method of data restoration requires no translation of data formats. Additional utility is obtained by permitting multiple record files for different users and for recalling record files to the screen so that specific sequences of keystrokes may be examined or tagged for "playback". This form of fault tolerance is memory intensive and it will be apparent to those skilled in the art that a record file can be constructed to loop back to its beginning after a specified time, or after keying a predetermined number of keystrokes, to overwrite itself in a continuous fashion as with many aircraft flight data recorders (such recorders having no controlling "playback" ability).

Still a further capability of the device is obtained by supplying it with programming necessary to selectably emulate the output of several different keyboards. It will be appreciated that many types of keyboard interfaces exist on many types of computers. Different interfaces often require different codes, different code transmission timing and often utilize different methods for acknowledging reception of a code. It will be appreciated by those skilled in the art that a selectable output table can be arranged. When a host H1 is selected, codes C1, timing T1 and protocol P1 are automatically selected. Selection of a different host would reference a different output emulation. Thus, such a programmable keyboard can embody a variety of host computers with the many advantageous features described herein.

It will also be appreciated that many types of keyboard interface, such as those on an IBM PC, can be controlled by operating programs on the host computer to transfer data files serially to and from the keyboard. Moreover, certain background programs may be loaded into the working memory of many personal computers which may be caused to execute from within other applications by a unique keystroke combination. Such host personal computer programs are well known as memory-resident programs. Thus it is apparent that the inventive device is capable of applying these unique keystroke combinations to the host PC, resulting in initiation of the memory-resident program. Such a program is capable of tagging and transferring complete files to and from the device. This combination gives the inventive device a simple method of data upload and download without the use of cabling or media. Utilization of a memory-resident data transfer program on the host computer eliminates the need to alter menus and allows transfer from within other applications at any time.

A menu-driven communications program is also included in program memory 30, or alternatively may be loaded into working memory 32, to allow the user to configure the remote device 20 to accept data from a variety of input devices 22 by selecting the mode of data input. It will be appreciated that a typical communication program also permits the user to select serial or parallel modes and simplex, half-duplex or full-duplex configurations, by use of the keyboard and display. Additionally, by using such a program, the user can select the input transfer speed, or baud rate, as well as the proper settings of start bits, stop bits, data bits, and parity bits required to conduct the transfer. Such programs also permit the user to select the input data code type such as ASCII, extended ASCII, ANSI, binary coded decimal, EBCDIC, or hexadecimal. The ensuing description will clarify methods for enhancing typical communications software to import, store, translate and output keystroke data to any of a plurality of applications operating on plural computers.

Rather than configure each element individually, the user may select a specific input device 22, as well as a specific application program and communications protocol, from a menu of preconfigured input devices 22. Although not explicitly shown herein, such menu programs are well known and widely commercially available, permitting the use of a single keystroke to select an application program, for example. It thus would be a simple matter for one of ordinary skill, guided by the present description, to provide such a menu wherein particular input devices, configured in a specified manner, are identified for selection by the user, in addition to selection of the desired application program.

Another feature of the present invention is the ability of the disclosed structure to import data inputted from one source, for use by -one application program, for use by a second application program. "Importing" is a known process by which codes stored in a specified format of a known application program are translated into a different format, as used by another application program. In the embodiment of the invention which incorporates a resident text processor, incoming codes from input device 22 are imported into the format of the text editing program resident in the remote device 20.

The following illustrates the import process.

Figure 3:
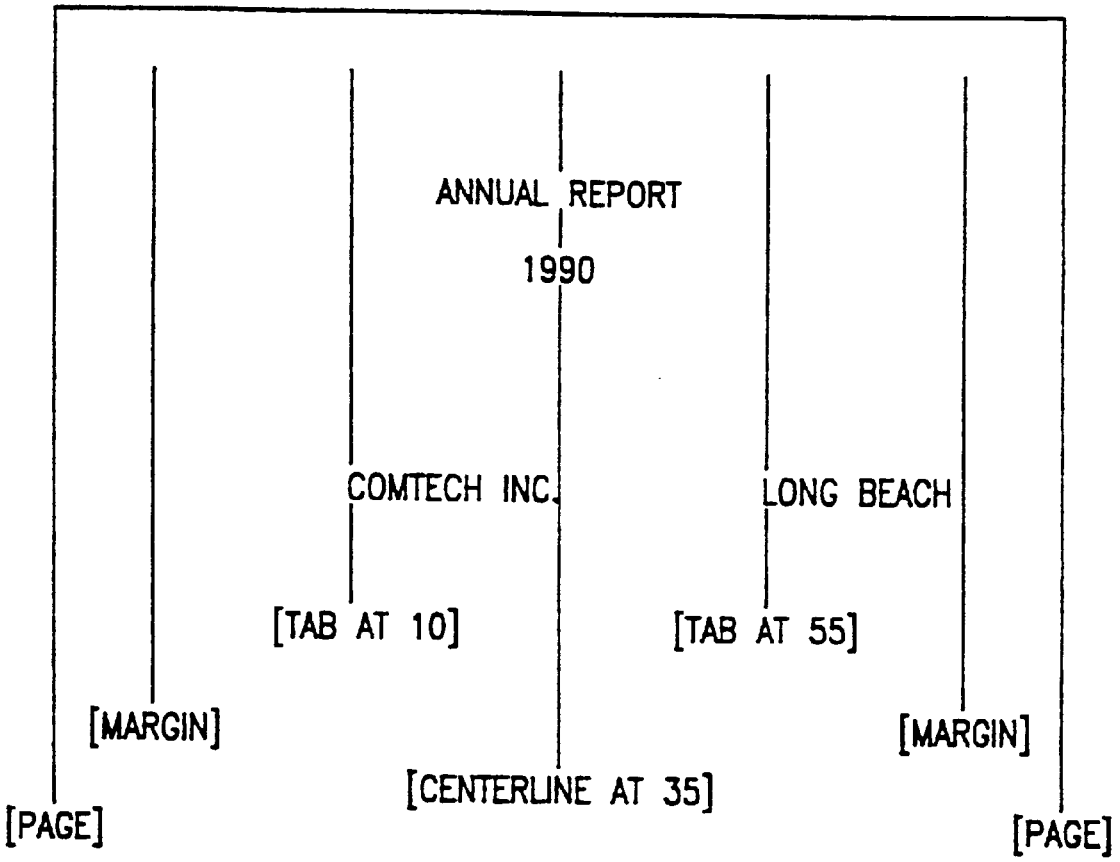
FIG. 3 illustrates a sample document for use in two word processors.

A sample document shown in FIG. 3 is to be stored in two word processors WP1 and WP2. WP2 may represent the text processor resident in the memory of the remote device 20. FIG. 4 shows that in each of these word processors, printable characters 56 and function codes 58, 60, 62 are stored as two-byte codes 64. Additionally, this Figure shows that each character code 56 and function code 58, 60 and 62 is stored as a different two-byte code in each of the two word processors. Comparison of the stored data strings 66 and 68 shows that the function codes 58 60 and 62 in each word processor are not only stored differently, but, with the exception of [CR] (carriage return), they behave differently. For example, the [CEN] (center) function 58 of a stored data string 66 functions in WP1 to indicate the following command: "the following characters are to be centered, until another [CEN] command is encountered". The [CEN] function 58 of stored data string 68 references an object length stored in the next two characters (four bytes) which, in the example of FIG. 4, is the number 13. Thus, the [CEN] function 58 of WP2 functions to indicate the following command: "the 13 characters following the object are to be centered".

The format of a file stored in accordance with the rules of word processor WP1 cannot be "read" directly by processor WP2. WP2 thus includes an import function to translate files from various other word processors, such as WP1. In performing this function, a look-up table is used for translation of characters and an algorithm may be required to translate function codes.

For example, translation of a character such as "A" is done by searching a substitution table, or cross-reference index, for the WP1 code representing "A". This index cross-references the code 00000010, 00000010 in WP1 to the code 10000010, 10000010 in WP2. Upon finding the WP1 code for the character A the WP2 cross-reference code is substituted therefor in a straight-forward manner. Thus, each of the character codes generated under WP1 is translated to codes which would be generated under WP2.

Translation of the [CEN] command illustrates the use of an algorithm for conversion of the function codes from WP1 to WP2. The algorithm for translating [CEN] counts the characters between the [CEN] commands of WP1, translates the first [CEN] command (by using the cross-reference index), inserts the result of the count, translates each individual character between the two [CEN]commands (by using the cross-reference index) and strips the last [CEN] command. Similar algorithms are used for translation of other function codes, where necessary. It will be appreciated that, for some commands, illustrated by the carriage return command [CR], function code translation merely involves reference to the cross-reference index and straightforward substitution.

Once all characters and all functions have been translated, the file can be edited by WP2. The above process is applicable to all importation processes. However, the foregoing example is provided to illustrate importation to a popular DOS-based word processor, which is used as a resident text editor of the remote device 20.

An additional translation is required to "export" the edited file to the keyboard interface of the destination computer. The resident program of the inventive remote device 20 thus provides a menu to allow the user to select one or both of the destination computer and the application program, such as Word Star on the IBM PC. Transfer from the text stored in memory 32 to the destination computer is accomplished in the following manner, without the complex requirements associated with data transfer using RS232 ports.

The user sets the remote device 20 to the bypass mode (or to the keyboard emulation routine in the active mode) and activates the application program (e.g., Word Star) on the destination computer 42. As will be recalled, this may be done by opening contacts 70 and 72 and closing contacts 74 as shown in FIG. 7B, thus using the remote device 20 as a standard keyboard for the destination computer. The user then sets the remote device 20 to a transfer routine in the active mode, in order to transfer the selected file from memory 32 of the remote device to the destination computer.

With the destination computer and application selected, the inventive device is prepared to translate and transfer data. Each character of the selected file is outputted as the keystroke code required to generate that character in the application. Each function is outputted as the keystroke code (or codes) required to perform that function on the target application. Each function in the file is translated by algorithm into the series of keystrokes which would generate the same result on the destination application.

Where the application in the destination computer is Word Star, the [CEN]13 command would transfer the keystroke codes corresponding to the next 13 characters, followed by the codes issued when the Control key is depressed along with the keys "0" then "C". This is the keystroke combination required by Word Star to center a line of text which has already been typed. If the destination application were Word Perfect, the [CEN]13 command would transfer to the destination computer the codes issued when the Shift key is depressed together with the "F6" key, which is the Word Perfect code for the text centering function. Thereafter, the 13 keystroke codes representing the text would be transferred, followed by the concluding center command, which is again the combination of the Shift key and the "F6" key.

Additional output software is incorporated in this embodiment of the invention for adjusting the rate of data output via the keyboard interface. The user may preset the output rate by accessing a menu and inputting the desired data rate. Alternatively, the user may preset the data rate by selecting the model of the destination computer 42 and application program from a menu, which corresponds to selecting a preconfigured keystroke data input rate compatible with both the application program and the destination computer. As will be appreciated, such a program may be made responsive to the "+" and "−" keys (or to other keys) of the attached keyboard during data output. These keys are thus respectively usable to speed up and slow down the output rate.

In other embodiments, on-line data translations are provided for a keyboard interface 40 of a different destination computer 42 and for other software application packages. One such on-line process changes the functions of certain keys in one software package to maintain the "feel" of another package. Another on-line process interchanges the functions of all keys to correspond to another layout such as a Dvorak style keyboard. In still another process, the user can avoid typing repetitive strings of keystrokes by storing the strings as character and function code strings known as macros. Transmission of stored macros is implemented by depression of single keys, such as function keys, or chorded keys, such as Alt-A. Word macros are also supported by such an arrangement.

In the preferred embodiment, the remote device 20 is portable, incorporating one or more batteries as a source of power. These batteries are preferably capable of powering the circuitry of the remote device 20 for a period of eight hours.

As will be appreciated by those skilled in the art, a number of modifications may be made in the above described structure. For example, the input device 22 may be a device with an analog output. Devices such as sensors, meters scanners and the like typically provide analog outputs. In such an arrangement, an input interface capable of converting analog data to digital data is used in place of the digital interface 26 shown in FIG. 1. This device can be a common analog-to-digital converter.

In still another modification, the input interface 26 shown in FIG. 1 may be replaced by other known interface circuitry, as will be appreciated by those skilled in the art. Three illustrations follow. In one arrangement, the input interface 26 is simply provided as an addressable location on the data bus. The resident program in memory 30 controls the processor 28 to poll the addressable location by enabling and reading data therefrom. Resident program steps are also contained to handshake the addressable location by enabling and writing data thereto.

In another variation, the input interface 26 may be a USART (universal synchronous/asynchronous receiver/transmitter), such as a model 8251 USART available from Intel. As known in the art, this device may be programmed to transmit and receive serial data from a keyboard, for example, in either synchronous or asynchronous modes. When a character has been received, the USART stores the character in a data bus buffer and sends a character ready signal to processor 28.

In yet a third example, input interface 26 may be a PIO, of the type hereinabove described. However, the PIO of this example is configured to accept data and clock signals on two data lines configured as inputs thereto.

The program memory 30 of this embodiment contains resident program steps to control the processor 28 to respond to interrupts from either the USART or the PIO by enabling the device and reading data therefrom. Resident program steps are also contained to handshake via the USART or PIO by enabling and writing data thereto.

It will be appreciated that, depending on the protocol used for input data transfer, the remote device 20 must return to the input device 22 signals representing well known communication control characters to control data flow and to verify data accuracy. These characters include, for example, DTR (data terminal ready), XON/XOFF (transfer flow control), ACK (acknowledge) and NAK (negative acknowledge). The input interfaces 26 described above are all capable of performing as transmitters to provide this required hand-shaking under direction of applicable communications software. This capability is well-known in the art and accordingly no further description is necessary.

In yet another modification, the output interface 38 may be provided as a keyboard decoder chip from a device, such as a keyboard, which is compatible with the keyboard interface 40 of the destination computer 42. As will be understood from the following, such decoder chips can be controlled by the processor 28 so that the inputs thereof appear to be accepting keyswitch closure information. The decoder chip then transmits the appropriate code and clock signals in serial form.

Figure 8:
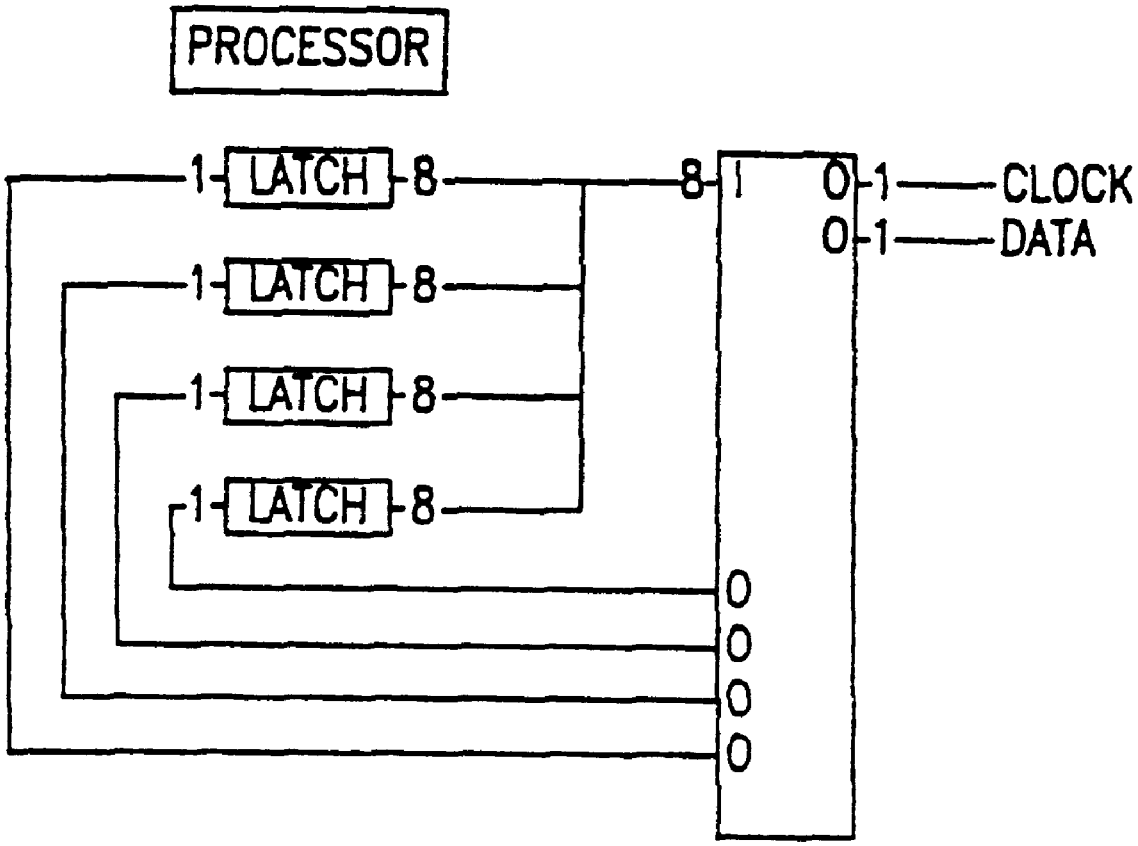
FIG. 8 is a schematic circuit diagram utilizing a keyboard decoder chip as an output interface.

FIG. 8 shows an example of a decoder chip with eight column inputs and four row scanning outputs. In typical operation, the rows are scanned by sequential application of a low bit from the decoder to the respective rows while the remaining rows are held high. When a key is depressed, the low bit is read by a column input to the decoder. By identifying the row input which was low when the low code was detected for a given column the matrix position of the depressed key is determined and a keystroke code is outputted. FIG. 8 shows that depressions of keyswitches can be simulated by the processor 28 if four latches are added. One latch is used for each row to be scanned. To simulate the output of a given keyswitch, the latch corresponding to the output row of the keyswitch is sent a data byte by the processor 28 on the data bus (not shown). The byte provides a low level on one of the eight input lines, simulating the column output from a particular keyswitch. All other positions of all other latches are held high. The latches are sequentially enabled by the row scanning outputs. When the row corresponding to the simulated key outputs its scan code, the latch is enabled to output the low bit to a specific input line of the decoder. Thus, keyswitch closures are simulated to the decoder chip and the decoder chip outputs the appropriate keystroke codes on its clock and data lines.

In another embodiment, the output interface 38 may be an addressable location, a USART or a PIO, as hereinabove described for the embodiments of input interfaces 26.

In still another modification, the output interface 38 may be similar to the output interface of the KeyTronic KB5152V voice-actuated keyboard. This keyboard is capable of outputting keystroke macros to the keyboard interface 40 of a destination computer 42, when prompted by voice.

In a further variation, the remote device 20 may comprise a laptop computer and interface elements. The laptop computer may be similar to a type commercially available as a model T1200, made by Kabushiki Kaisha Toshiba Corporation of Kawasaki, Japan. This laptop computer includes a keyboard, display, disk memory, battery power and communications ports. Resident programs operating on the laptop comprise a disk operating system, such as MS-DOS 3.1 by Microsoft Corporation of Redmond, Wash., and text and numerical editing programs, such as Framework II, by Ashton-Tate of Culver City, Calif. Working and program memory are both on floppy disk. The process of translating characters of a known file into keystrokes which, when outputted to the keyboard interface of a destination computer, result in the creation of a similar file has been described hereinabove with respect to use of a cross-reference file and a number of algorithms. A resident program is provided, which, can select data from a Framework II file and output the data as keystroke codes into a variety of other applications operating on a variety of destination computers. Thus, the only hardware required to implement this advantageous feature of the invention is a cable, which attaches to a communications port on the laptop and to the keyboard interface of the destination computer.

The above described device accordingly provides a novel communication ability, permitting a user to enter data at a remote location, to edit the text, and conveniently to transfer the data to a particular application program, such as Word Star for instance, operating on an IBM PC. A moment later, the user can transfer the same text to a different application program, such as MacWrite, operating on an Apple Macintosh. The user can then transfer the same text to a mainframe computer. None of these cases requires any special hardware or software to be installed on the destination computer. Further, the user is not required to possess special knowledge of the destination computer. A long felt need is thus satisfied by the inventive device.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

I claim:

1. A portable data input, storage and editing device comprising:

input means for data entry;

storage means for storage of data entered by said input means;

transfer means for transferring data entered by said input means to *the keyboard interface of* a *separate* host computer[;], *said transfer means comprising:*

*connecting means for connecting said portable device to the keyboard interface of the host computer and for transferring said data entered by said input means to the host computer via the keyboard interface of the host computer; and*

*emulator means for modifying said data prior to being transferred from said portable device for receipt by the keyboard interface of the host computer;* processor means for controlling said input means, said storage means and said transfer means to operate in one of a plurality of modes, and portable power storage means for operating at least said input means, said storage means and said processor means when said portable device is disconnected from the host computer thereby enabling remote input, storage and editing of said data entered by said input means[, wherein the host computer comprises a keyboard interface, and said transfer means comprises connecting means for connecting said device to said keyboard interface of the host computer and for transferring said data entered by said input means to the host computer via said keyboard interface].

2. A device as recited in claim 1, further comprising initiating means for initiating a program operating on the host computer.

3. A device as recited in claim 1, wherein the host computer comprises a power interface for selectively transferring power from the host computer to said input means, storage means and processor means when the device is connected to the host computer.

4. A device as recited in claim 1, further comprising macro generating means for replacing a first sequence of a first number of keystroke characters represented by said data entered by said input means by a second sequence of a second number of keystroke characters.

5. A device as recited in claim 1, further comprising output key means for initiating a data output transfer via said transfer means to the host computer.

6. A device as recited in claim 1, wherein said processor means for controlling said input means, said storage means and said transfer means to operate in one of a plurality of modes is programmed for controlling said input means, said storage means and said transfer means to operate in:

an active mode wherein said data entered by said input means is stored in said storage means and said transfer means accesses data from said storage means for transfer to the host computer, and a bypass mode wherein said transfer means transfers data directly from said input means to the host computer.

7. A device as recited in claim 3, wherein said program is operable for controlling transfer of file data between said device and the host computer.

8. A device as recited in claim 7 wherein said program is RAM-resident.

9. A device as recited in claim 6 wherein said input means comprises a keyboard for inputting data to the host computer, thereby providing for the host computer a detachable keyboard for standard and remote operation, wherein in standard operation said processor means controls said input means, storage means and transfer means to operate in said bypass mode and said keyboard is attached to the host computer via said keyboard interface to input sequences of characters to the host computer, while in said remote operation said processor means controls said input means, storage means and transfer means to operate in said active mode and said keyboard is detached from the host computer for inputting sequences of characters to said storage means for subsequent transfer via said keyboard interface to the host computer.

10. A device as recited in claim 6, further comprising a bypass means for causing said processor means to establish said bypass mode.

11. A device as recited in claim 9 wherein said transfer means further comprises emulation means for emulating a keyboard of any of a plurality of computers, thereby allowing said device to be used as the keyboard of any of said computers.

12. A device as recited in claim 10, wherein said bypass means comprise a program for selecting among a plurality of operating modes, including a keyboard emulation mode wherein said input means emulates one of a plurality of predetermined keyboards of the host computer.

13. A device as recited in claim 10 wherein said bypass means comprises a plurality of switches for routing data from said input means to said transfer means via said storage means and for routing data from said input means to said transfer means bypassing said storage means.

14. A device as recited in claim 10 further comprising editing means for editing strings of characters represented by said data entered by said input means prior to transfer said data to the host computer, said bypass means comprises means for routing data from said input means to said transfer means via said storage means in said active mode and for routing data from said input means to said transfer means in said bypass mode, bypassing said storage means, and for bypassing said editing means in said bypass mode.

15. A portable data input, storage and editing device comprising:

input means for data entry;

storage means for storage of data entered by said input means;

transfer means for transferring data entered by said input means to *the keyboard interface of* a *separate* host computer*, said transfer means comprising:*

*connecting means for connecting said portable device to the keyboard interface of the host computer and for transferring said data entered by said input means to the host computer via the keyboard interface of the host computer, and*

*emulator means for modifying said data prior to being transferred from said portable device for receipt by the keyboard interface of the host computer*; and processor means for controlling said input means, said storage means and said transfer means to operate in one of a plurality of modes including:

an active mode wherein said data entered by said input means is stored in said storage means and said transfer means accesses data from said storage means for transfer to the host computer, and a bypass mode wherein said transfer means transfers data directly from said input means to the host computer, further comprising editing means for editing strings of characters represented by said data entered by said input means prior to transfer said data to the host computer[, wherein the host computer comprises a keyboard interface, and said transfer means comprises connecting means for connecting said device to said keyboard interface of the host computer and for transferring said data entered by said input means to the host computer via said keyboard interface].

16. A portable data input, storage and editing device comprising:

input means for data entry;

storage means for storage of data entered by said input means;

transfer means for transferring data entered by said input means to *the keyboard interface of* a *separate* host computer*, said transfer means comprising:*

*connecting means for connecting said portable device to the keyboard interface of the host computer and for transferring said data entered by said input means to the host computer via the keyboard interface of the host computer, and*

*emulator means for modifying said data prior to being transferred from said portable device for receipt by the keyboard interface of the host computer*; and processor means for controlling said input means, said storage means and said transfer means to operate in one of a plurality of modes including:

an active mode wherein said data entered by said input means is stored in said storage means and said transfer means accesses data from said storage means for transfer to the host computer, and a bypass mode wherein said transfer means transfers data directly from said input means to the host computer, further comprising translating means for translating sequences of characters represented by said data entered by said input means from an input format for the device to a format usable by an application program running on the host computer[, wherein the host computer comprises a keyboard interface, and said transfer means comprises connecting means for connecting said device to the keyboard interface of the host computer and for transferring said data entered by said input means to the host computer via said keyboard interface].

17. A device is recited in claim 16 wherein said translating means operates to translate said sequence of characters from said input format to any of a plurality of formats used by multiple applications running on said host computer.

18. A device is recited in claim 16 wherein said translating means operates to translate said sequences of characters form one format usable by one application program running on the host computer to another format usable by another application program running on the host computer.

19. A portable data input, storage and editing device comprising:

input means for data entry;

storage means for storage of data entered by said input means;

transfer means for transferring data entered by said input means to *the keyboard interface of* a *separate* host computer

*connecting means for connecting said portable device to the keyboard interface of the host computer and for transferring said data entered by said input means to the host computer via said keyboard interface of the host computer, and*

*an emulator means for modifying said data prior to being transferred from said portable device for receipt by the keyboard interface of the host computer*; and processor means for controlling said input means, said storage means and said transfer means to operate in one of a plurality of modes including:

an active mode wherein said entered data is stored in said storage means and said transfer means accesses data from said storage means for transfer to the host computer, and a bypass mode wherein said transfer means transfers data directly from said input means to the host computer,

[the host computer including a keyboard interface and said transfer means including connecting means for connecting said device to said keyboard interface of the host computer and for transferring said data entered by said input means to the host computer via said keyboard interface;]

said input means including a keyboard for inputting data [to] *for* the host computer, thereby providing for the host computer a detachable keyboard for standard and remote operation, wherein in standard operation said processor means controls said input means, storage means and transfer means to operate in said bypass mode and said keyboard is attached to the host computer via [said] *the* keyboard interface *of the host computer* to input sequences of characters to the host computer *by the emulator means*, while in said remote operation said processor means controls said input means, storage means and transfer means to operate in said active mode and said keyboard is detached from the host computer for inputting sequences of characters to said storage means for subsequent transfer via [said] *the* keyboard interface to the host computer; and further comprising editing means for editing strings of characters represented by said data entered by said input means prior to transfer *of* said data to the host computer.

20. A device as recited in claim 19, further comprising macro generating means for replacing a first sequence of a first number of keystroke characters represented by said data entered by said input means by a second sequence of a second number of keystroke characters.

21. A device as recited in claim 19, further comprising a bypass means for causing said processor means to establish said bypass mode, said bypass means comprises means for routing data from said input means to said transfer means via said storage means in said active mode and for routing data from said input means to said transfer means in said bypass mode, bypassing said storage means, and for bypassing said editing means in said bypass mode.

22. A portable data input, storage and editing device comprising:

input means for data entry;

storage means for storage of data entered by said input means;

transfer means for transferring data entered by said input means to *the keyboard interface of* a *separate* host computer*, said transfer means comprising*

*connecting means for connecting said portable device to the keyboard interface of the host computer and for transferring said data entered by said input means to the host computer via the keyboard interface of the host computer, and*

*emulator means for modifying said data prior to being transferred from said portable device for receipt by the keyboard interface of the host computer*;

processor means for controlling said input means, said storage means and said transfer means, thereby enabling remote input, storage and editing of said data entered by said input means, and record and playback means for recording the data entered by said input means and for playing back the recorded data, thereby to provide a fault-tolerant operating capability to the *portable* device[, wherein the host computer has a keyboard interface, and said transfer means comprises connecting means for connecting said device to said keyboard interface of the host computer and for transferring said data entered by said input means to the host computer via said keyboard interface].

23. A device as recited in claim 22, wherein said transfer means comprises said record and playback means.

24. A device as recited in claim 22 wherein said input means comprises a keyboard.

*25. A portable data input, storage and editing device comprising:*

*first input means for data entry;*

*storage means for storage of data entered by said first input means;*

*transfer means for transferring data entered by said first input means to the keyboard interface of a separate host computer, said transfer means comprising:*

*connecting means for connecting said portable device to the keyboard interface of the host computer and for transferring said data entered by said first input means and emulating a second input means different from said first input means from said portable device to the host computer prior to being transferred from said portable device to the keyboard interface of the host computer;*

*processor means for controlling said first input means, said storage means and said transfer means to operate in one of a plurality of modes, wherein said processor means is programmed for controlling said transfer means to transfer data emulating second input means different from said first input means for receipt by a keyboard interface of the host computer, and*

*portable power storage means for operating at least said first input means, said storage means and said processor means when said portable device is disconnected from the host computer thereby enabling remote input, storage and editing of said data entered by said first input means.*

*26. A device as recited in claim 25, wherein the host computer comprises a power interface for selectively transferring power from the host computer to said input means, storage means and processor means when the portable device is connected to the host computer.*

*27. A device as recited in claim 25, further comprising output key means for initiating a data output transfer via said transfer means to the host computer.*

*28. A device as recited in claim 25, wherein said processor means is programmed for controlling said first input means, said storage means and said transfer means to operate in:*

*an active mode wherein said data entered by said first input means is stored in said storage means and said transfer means accesses data from said storage means for transfer to the host computer, and*

*a bypass mode wherein said transfer means transfers data directly from said first input means to the keyboard interface of the host computer.*

*29. A device as recited in claim 28, further comprising a bypass means for causing said processor means to establish said bypass mode.*

*30. A device as recited in claim 29 wherein said bypass means comprises a plurality of switches for routing data from said first input means to said transfer means via said storage means and for routing data from said input means to said transfer means bypassing said storage means.*

*31. A device as recited in claim 25 further comprising editing means for editing strings of characters represented by said data entered by said first input means prior to transfer of said data to the host computer.*

*32. A portable data input, storage and editing device comprising:*

*input means for data entry;*

*storage means for storage of data entered by said input means;*

*transfer means for transferring data entered by said input means to the keyboard interface of a separate host computer, said transfer means including:*

*emulating means for modifying said data prior to being transferred from said portable device to the keyboard interface of the host computer;*

*processor means for controlling said input means, said storage means and said transfer means to operate in one of a plurality of modes,*

*portable power storage means for operating at least said input means, said storage means and said processor means when said portable device is disconnected from the host computer thereby enabling remote input, storage and editing of said data entered by said input means, and*

*a means for housing said input means, storage means, transfer means, processor means and portable power storage means, and*

*connecting means for connecting said portable device to the keyboard interface of the host computer and for transferring said data entered by said input means from said portable device to be received by the keyboard interface of the host computer.*

*33. A device as recited in claim 32, wherein the host computer comprises a power interface for selectively transferring power from the host computer to said input means, storage means and processor means when the portable device is connected to the host computer.*

*34. A device as recited in claim 32, further comprising output key means for initiating a data output transfer via said transfer means to the host computer.*

*35. A device as recited in claim 32, wherein said processor means for controlling said input means, said storage means and said transfer means to operate in one of a plurality of modes is programmed for controlling said input means, said storage means and said transfer means to operate in:*

*an active mode wherein said data entered by said input means is stored in said storage means and said transfer means accesses data from said storage means for transfer to the host computer, and*

*a bypass mode wherein said transfer means transfers data directly from said input means to the keyboard interface of the host computer.*

*36. A device as recited in claim 35, further comprising a bypass means for causing said processor means to establish said bypass mode.*

*37. A device as recited in claim 36 wherein said bypass means comprises a plurality of switches for routing data from said input means to said transfer means via said storage means and for routing data from said input means to said transfer means bypassing said storage means.*

*38. A device as recited in claim 32 further comprising editing means for editing strings of characters represented by said data entered by said input means prior to transfer of said data to the host computer.*

*39. A device as recited in claim 32 wherein the transfer means further comprising an emulating means for modifying said data that is transferred from said portable device for receipt by the keyboard interface of the host computer.*

* * * * *